United States Patent
Joshi et al.

(10) Patent No.: US 12,224,808 B2
(45) Date of Patent: Feb. 11, 2025

(54) AUTOMATIC OPTIMIZATION METHOD OF PERFORMANCE PARAMETERS OF A SIGNAL GENERATOR CIRCUIT

(71) Applicant: Rohde & Schwarz GmbH & Co. KG, Munich (DE)

(72) Inventors: Ajan Joshi, Munich (DE); Florian Fischbacher, Munich (DE); Haisang Yu, Munich (DE); Chlodwig Neuhaeusler, Munich (DE); Michael Koenig, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 140 days.

(21) Appl. No.: 18/064,077

(22) Filed: Dec. 9, 2022

(65) Prior Publication Data
US 2024/0195515 A1    Jun. 13, 2024

(51) Int. Cl.
*H04B 17/00* (2015.01)
*H04L 25/03* (2006.01)
*H04L 27/20* (2006.01)

(52) U.S. Cl.
CPC ......... *H04B 17/0085* (2013.01); *H04L 25/03* (2013.01); *H04L 27/20* (2013.01)

(58) Field of Classification Search
CPC ...... H04B 17/0085; H04B 3/46; H04B 17/29; G01R 31/2841; G01R 31/2837; G01R 31/2839; G01R 33/3607; G01R 27/28; H04L 1/244; H04L 27/36; H04L 25/03; H04L 27/20; G06F 1/02; G06F 1/0321; G06F 1/0342
See application file for complete search history.

(56) References Cited

U.S. PATENT DOCUMENTS

| | | | | |
|---|---|---|---|---|
| 6,141,390 A | * | 10/2000 | Cova | H03F 1/3247 332/162 |
| 7,068,980 B2 | * | 6/2006 | Seo | H03F 1/3294 375/296 |
| 10,079,699 B1 | * | 9/2018 | Li | H04L 27/10 |
| 10,225,118 B1 | * | 3/2019 | Hagiwara | H04L 27/0014 |
| 11,777,496 B1 | * | 10/2023 | Chakraborty | G06N 10/40 327/291 |
| 2002/0048326 A1 | * | 4/2002 | Sahlman | H03F 1/3229 375/297 |
| 2003/0095607 A1 | * | 5/2003 | Huang | H04L 27/368 375/296 |
| 2009/0141828 A1 | * | 6/2009 | Huang | H04L 27/364 375/296 |

(Continued)

FOREIGN PATENT DOCUMENTS

CN           115278746 B  *  3/2023

*Primary Examiner* — Sophia Vlahos
(74) *Attorney, Agent, or Firm* — CHRISTENSEN O'CONNOR JOHNSON KINDNESS PLLC

(57) ABSTRACT

An optimization method of automatically optimizing a performance parameter of a signal generator circuit is described. An RF output signal is generated by the signal generator circuit. A performance parameter of the signal generator circuit is determined based on the RF output signal by the control circuit. At least one operational parameter of the signal generator circuit is adapted by the control circuit in order to optimize the performance parameter. Further, a signal generator circuit is described.

17 Claims, 5 Drawing Sheets

(56) References Cited

U.S. PATENT DOCUMENTS

| | | | |
|---|---|---|---|
| 2012/0300876 A1* | 11/2012 | Ito | H04L 27/36 |
| | | | 375/296 |
| 2013/0003889 A1* | 1/2013 | Earls | H04B 17/0085 |
| | | | 375/296 |
| 2013/0012139 A1* | 1/2013 | Otani | H04B 17/14 |
| | | | 455/67.14 |
| 2017/0163358 A1* | 6/2017 | Wadell | H04B 17/0085 |
| 2017/0322773 A1* | 11/2017 | Tangudu | G06F 7/50 |
| 2022/0303025 A1* | 9/2022 | Cheng | H04B 17/11 |
| 2023/0020369 A1* | 1/2023 | Falempin | H04L 27/368 |

* cited by examiner

AUTOMATIC OPTIMIZATION METHOD OF PERFORMANCE PARAMETERS OF A SIGNAL GENERATOR CIRCUIT

FIELD OF THE DISCLOSURE

Embodiments of the present disclosure generally relate to an optimization method of automatically optimizing a performance parameter of a signal generator circuit. Embodiments of the present disclosure further relate to a signal generator circuit.

BACKGROUND

Signal generator circuits are used for a multitude of different tests that are conducted on a large variety of electronic devices. For example, signal generator circuits are used in order to generate RF signals for testing wireless communication equipment, e.g. devices under test that are configured to communicate via WLAN, LTE or 5G New Radio.

If precise tests are to be performed on a device under test, the settings of the signal generator circuit have to be optimized in order to minimize unwanted influences of the signal generator circuit on the test conducted. Usually, the configuration of the signal generator circuit is done by hand, which requires a considerable amount of expertise from a user of the signal generator circuit.

Thus, there is a need for a signal generator as well as for an optimization method of optimizing a performance parameter of a signal generator circuit that are easier to operate.

SUMMARY

Embodiments of the present disclosure provide an optimization method of automatically optimizing a performance parameter of a signal generator circuit. The signal generator circuit comprises, for example, a digital signal generator circuit, a digital compensation circuit, at least one digital-to-analog converter (DAC), an IQ modulation circuit, an RF circuit, and a control circuit. In an embodiment, the optimization method comprises the steps of:
- generating, by the digital signal generator circuit, a digital baseband signal;
- filtering, by the digital compensation circuit, the digital baseband signal, thereby obtaining a filtered baseband signal;
- converting, by the at least one DAC, the filtered baseband signal into an analog baseband signal;
- modulating, by the IQ modulation circuit, the analog baseband signal, thereby obtaining a modulated RF signal,
- processing, by the RF circuit, the modulated RF signal, thereby obtaining an RF output signal,
- determining, by the control circuit, a performance parameter of the signal generator circuit based on the RF output signal, and
- automatically adapting, by the control circuit, at least one operational parameter of the signal generator circuit in order to optimize the performance parameter.

The at least one operational parameter comprises, for example, a power level of the digital baseband signal, a baseband frequency offset of the digital baseband signal, a filter headroom of the digital compensation circuit, a frequency response of the digital compensation circuit, an operating point of the at least one DAC, an IQ offset of the IQ modulation circuit, a gain of the IQ modulation circuit, a quadrature value of the IQ modulation circuit, and/or an RF frequency offset of the RF circuit.

Therein and in the following, the term "digital compensation circuit" is understood to denote an electronic component or an electronic circuit having a linear or non-linear transfer function. The transfer function may be adaptable by the control circuit. In some embodiments, the digital compensation circuit may be established as a linear digital filter circuit or as a non-linear digital filter circuit.

The optimization method according to embodiments of the present disclosure is based on the idea to automatically optimize the performance parameter of the signal generator circuit. For this purpose, the RF output signal is generated as described above, and the generated RF output signal is analyzed by the control circuit. Based on the analysis of the RF output signal, the at least one operational parameter of the signal generator circuit is automatically adapted in order to optimize the performance parameter of the signal generator circuit.

Thus, the user is assisted in setting up the signal generator circuit for measurements, as the performance parameter of the signal generator circuit is automatically optimized. Accordingly, even inexperienced users are enabled to conduct precise measurements, as no prior experience in optimizing the different operational parameters of the signal generator circuit is required.

The signal generator circuit may be comprised in a signal generator device, namely a standalone signal generator. Alternatively, the signal generator circuit may be integrated into a measurement instrument, for example into a mobile communication tester or into an oscilloscope. As another example, the signal generator circuit may be integrated into an echo generator for performing tests on radar devices.

According to an aspect of the present disclosure, the performance parameter is, for example, an error vector magnitude (EVM) or an adjacent channel leakage ratio (ACLR). Thus, the optimization method according to embodiments of the present disclosure allows for optimizing the performance parameter of the signal generator circuit for different types of measurements, namely measurements requiring minimal EVM or measurements requiring minimal ACLR.

In some embodiments, a user may choose the performance parameter to be optimized via a suitable user interface of the signal generator circuit.

In an embodiment of the present disclosure, the operating point of the at least one DAC is raised if the performance parameter is an EVM. By raising the operating point of the DAC, the signal-to-noise ratio (SNR) of the RF output signal is increased, which in general leads to a smaller EVM.

This may come at the cost of the DAC being operated in a non-linear region, i.e. at signal levels where there is a non-linear relation between an output signal of the DAC and an input signal of the DAC. However, increasing the SNR is more important for lowering the EVM than such non-linearities of the DAC. In some embodiments, increasing the SNR leads to lower values of the EVM, while operating the DAC in an early non-linear region does not impact modulated signals, e.g. OFDM signals, significantly.

According to another aspect of the present disclosure, the operating point of the at least one DAC is, for example, lowered if the performance parameter is an ACLR. By lowering the operating point, the DAC is operated in a linear region, i.e. there is a linear relation between an output signal of the DAC and an input signal of the DAC. In general, the ACLR is reduced by operating the DAC in the linear region.

Lowering the operating point of the DAC may come at the cost of a reduced SNR. However, operating the DAC in a linear region is more important for lowering the ACLR than a reduced SNR.

In a further embodiment of the present disclosure, the at least one operational parameter is adapted iteratively. In other words, the RF output signal may be generated based on an initial set of operational parameters of the signal generator circuit. Based on the RF output signal, the at least one operational parameter is adapted, thereby obtaining an adapted set of operational parameters. A further RF output signal may be generated based on the adapted set of operational parameters. Based on the further RF output signal, the same operational parameter(s) or (an)other operational parameter(s) may be adapted. By performing several iterations, the quality of the optimized operational parameters is enhanced, such that the quality of the optimized performance parameter is enhanced.

The operational parameter(s) may be further adapted iteratively until a target performance parameter is obtained, until the performance parameter converges, until the operational parameter(s) converge, and/or until a predefined number of iterations is reached.

A further aspect of the present disclosure provides that a frequency response of the IQ modulation circuit and/or a frequency response of the RF circuit is, for example, determined in order to adapt the at least one operational parameter.

In an embodiment of the present disclosure, the frequency response of the digital compensation circuit is adapted to pre-compensate the frequency response of the IQ modulation circuit and/or the frequency response of the RF circuit. In other words, filter parameters of the digital compensation circuit are adapted such that a predefined overall frequency response of the signal generator circuit is obtained. Thus, the overall frequency response of the signal generator circuit can be optimized by adapting the frequency response of the digital compensation circuit.

In some embodiments, a user-defined frequency response of the signal generator circuit can be set.

In some embodiments, the frequency response of the digital compensation circuit is adapted such that an overall frequency response of the signal generator circuit is flat. In other words, filter parameters of the digital compensation circuit are adapted such that the overall frequency response of the signal generator circuit is (approximately) constant at least over a relevant frequency spectrum.

The IQ offset of the IQ modulation circuit, the gain of the IQ modulation circuit, and/or the quadrature value of the IQ modulation circuit may be adapted by a numerical optimization technique. In general, these operational parameters are adapted such that the RF output signal is modulated precisely. Thus, the EVM of the generated RF output signal is reduced, as the constellation points of symbols comprised in the RF output signal deviate less from their associated optimal constellation points. Moreover, local oscillator (LO) leakage effects may be reduced.

In some embodiments, any suitable numerical optimization technique known in the state of the art may be used.

According to an aspect of the present disclosure, a predetermined baseband signal corresponding to a predetermined number of constellation points is, for example, generated in order to adapt the IQ offset of the IQ modulation circuit, the gain of the IQ modulation circuit, and/or the quadrature value of the IQ modulation circuit. Based on the resulting RF output signal comprising symbols corresponding to the predetermined number of constellation points, an array of independent non-linear equations can be set up. The IQ offset of the IQ modulation circuit, the gain of the IQ modulation circuit, and/or the quadrature value of the IQ modulation circuit may be adapted by solving the array of independent non-linear equations.

In some embodiments, the array of independent non-linear equations may be solved using the Newton-Raphson method.

In some embodiments, the predetermined number of constellation points is equal to six. However, it is to be understood that any other suitable number of constellation points may be used.

According to another aspect of the present disclosure, the RF frequency offset, for example, compensates for the baseband frequency offset. Accordingly, the RF frequency offset and the baseband frequency offset may be adapted simultaneously, such that the adapted RF frequency offset compensates for the adapted baseband frequency offset.

In general, by adding the baseband frequency offset, local oscillator (LO) leakage effects can be reduced or even removed entirely. Further, an image signal can be removed completely. By adding the RF frequency offset to the modulated RF signal, the baseband frequency offset is compensated and the intended RF output signal is restored.

A further aspect of the present disclosure provides that the signal generator circuit comprises, for example, a user interface, wherein the optimization method may be started by the user interface. In other words, a user may conveniently start the optimization method(s) described above via the user interface, for example by pressing an associated button of the user interface.

As another example, the user may select the performance parameter to be optimized via the user interface. In some embodiments, the user may select the performance parameter to be optimized, i.e. the EVM or the ACLR, from a drop-down menu.

Embodiments of the present disclosure further provide a signal generator circuit. In some embodiments, the signal generator circuit comprises a digital signal generator circuit, a digital compensation circuit, at least one digital-to-analog converter (DAC), an IQ modulation circuit, an RF circuit, and a control circuit. The digital signal generator circuit is configured to generate a digital baseband signal. The digital compensation circuit is configured to filter the digital baseband signal, thereby obtaining a filtered baseband signal. The at least one DAC is configured to convert the filtered baseband signal into an analog baseband signal. The IQ modulation circuit is configured to modulate the analog baseband signal, thereby obtaining a modulated RF signal. The RF circuit is configured to process the modulated RF signal, thereby obtaining an RF output signal. The control circuit is configured to determine a performance parameter of the signal generator circuit based on the RF output signal. The control circuit is configured to automatically adapt at least one operational parameter of the signal generator circuit in order to optimize the performance parameter. The at least one operational parameter comprises a power level of the digital baseband signal, a baseband frequency offset of the digital baseband signal, a filter headroom of the digital compensation circuit, a frequency response of the digital compensation circuit, an operating point of the at least one DAC, an IQ offset of the IQ modulation circuit, a gain of the IQ modulation circuit, a quadrature value of the IQ modulation circuit, and/or an RF frequency offset of the RF circuit.

Thus, the signal generator circuit is configured to self-calibrate by adapting the at least one operational parameter, thereby optimizing the performance parameter.

In some embodiments, the signal generator circuit is configured to perform one or more of, or all of, the optimization methods described above.

Regarding the further advantages and properties of the signal generator circuit, reference is made to the explanations given above with respect to the optimization method, which also hold for the signal generator circuit and vice versa.

According to an aspect of the present disclosure, the signal generator circuit comprises, for example, a user interface, wherein the signal generator circuit is controllable via the user interface to perform an optimization of the performance parameter. In other words, a user may conveniently start the optimization method described above via the user interface, for example by pressing an associated button of the user interface.

As another example, the user may select the performance parameter to be optimized via the user interface. In some embodiments, the user may select the performance parameter to be optimized, i.e. the EVM or the ACLR, from a drop-down menu.

In an embodiment of the present disclosure, the performance parameter is an error vector magnitude (EVM) or an adjacent channel leakage ratio (ACLR). Thus, the signal generator circuit according to the present disclosure is configured to self-calibrate for different types of measurements, namely measurements requiring minimal EVM or measurements requiring minimal ACLR.

In a further embodiment of the present disclosure, the RF circuit comprises at least one RF filter, at least one power amplifier, at least one mixer, and/or at least one switch. However, it is to be understood that the RF circuit may comprise any other suitable electronic components.

In some embodiments, the at least one mixer is configured to add the RF frequency offset to the modulated RF signal.

In some embodiments, the RF circuit may be integrated on a single chip.

In some embodiments, the control circuit is configured to determine a frequency response of the IQ modulation circuit and/or a frequency response of the RF circuit. More precisely, the control circuit may be configured in some embodiments to determine the frequency response of the IQ modulation circuit and/or the frequency response of the RF circuit based on the RF output signal and based on the digital baseband signal, for example by comparing the RF output signal and the digital baseband signal.

A further aspect of the present disclosure provides that the control circuit is configured, for example, to adapt the frequency response of the digital compensation circuit such that the frequency response of the IQ modulation circuit and/or the frequency response of the RF circuit are/is pre-compensated. In other words, the control circuit is configured to adapt filter parameters of the digital compensation circuit such that a predefined overall frequency response of the signal generator circuit is obtained. Thus, the overall frequency response of the signal generator circuit can be optimized by adapting the frequency response of the digital compensation circuit.

In an embodiment of the present disclosure, the control circuit is configured to adapt the frequency response of the digital compensation circuit such that an overall frequency response of the signal generator circuit is flat. In other words, the control circuit is configured to adapt the filter parameters of the digital compensation circuit such that the overall frequency response of the signal generator circuit is (approximately) constant at least over a relevant frequency spectrum.

According to another aspect of the present disclosure, the RF circuit is configured, for example, to add the RF frequency offset to the modulated RF signal, wherein the control circuit is configured to generate the RF frequency offset such that the RF frequency offset compensates for the baseband frequency offset. Accordingly, the control circuit may be configured to adapt the RF frequency offset and the baseband frequency offset simultaneously, such that the adapted RF frequency offset compensates for the adapted baseband frequency offset.

Embodiments of the present disclosure further provide a signal generator circuit. In an embodiment, the signal generator circuit comprises a digital signal generator circuit, a digital compensation circuit, at least one digital-to-analog converter (DAC), an IQ modulation circuit, an RF circuit, and a control circuit. The digital signal generator circuit is configured to generate a digital baseband signal. The digital compensation circuit is configured to filter the digital baseband signal, thereby obtaining a filtered baseband signal. The IQ modulation circuit is configured to modulate the filtered baseband signal, thereby obtaining a digital modulated RF signal. The at least one DAC is configured to convert the digital modulated RF signal into a modulated RF signal, wherein the modulated RF signal is an analog signal. The RF circuit is configured to process the modulated RF signal, thereby obtaining an RF output signal. The control circuit is configured to determine a performance parameter of the signal generator circuit based on the RF output signal. The control circuit is configured to automatically adapt at least one operational parameter of the signal generator circuit in order to optimize the performance parameter. The at least one operational parameter comprises a power level of the digital baseband signal, a baseband frequency offset of the digital baseband signal, a filter headroom of the digital compensation circuit, a frequency response of the digital compensation circuit, an operating point of the at least one DAC, and/or an RF frequency offset of the RF circuit.

Compared to some embodiments of the signal generator circuit described above, the IQ modulation circuit is configured to operate in the digital domain. In other words, the signal generator circuit comprises a direct modulation circuit, wherein the direct modulation circuit comprises the digital signal generator circuit and the IQ modulation circuit.

Regarding the further advantages and properties of the signal generator circuit, reference is made to the explanations given above with respect to the optimization method and with respect to the first variant of the signal generator circuit, which also hold for the second variant of the signal generator circuit and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
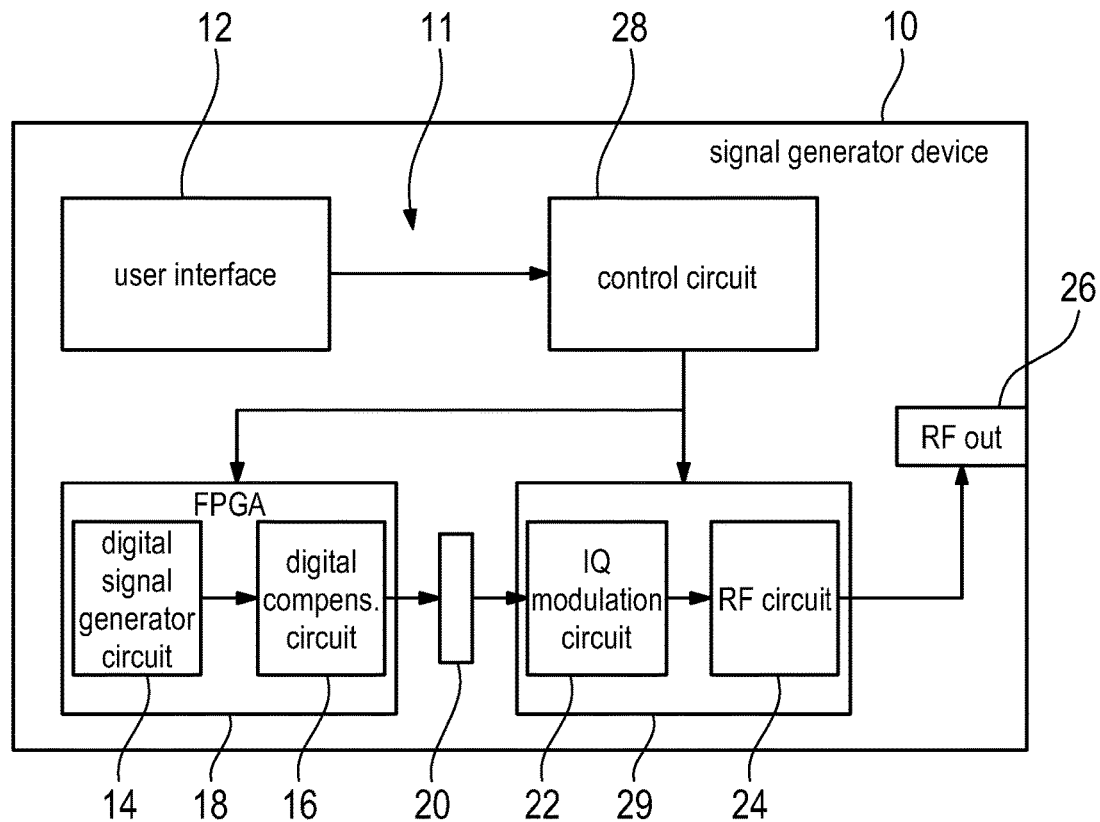
FIG. 1 schematically shows a signal generator device with a signal generator circuit according to an embodiment of the present disclosure.

FIG. 1 schematically shows an example of a signal generator device 10 comprising a signal generator circuit 11. In general, the signal generator circuit 11 is configured to generate an RF output signal having predefined properties, for example a predefined modulation, wherein the predefined properties may, e.g., be adapted via a user interface 12 of the signal generator device 10 or of the signal generator circuit 11.

In some embodiments, the signal generator device 10 may be a standalone signal generator. In other embodiments, the signal generator device 10 may be established as an echo generator for performing tests on radar devices. It is to be understood that the signal generator circuit 11 may also be integrated into a measurement instrument, for example into a mobile communication tester or into an oscilloscope, a signal analyzer, a vector network analyzer, etc.

The RF output signal generated by the signal generator circuit 11 may be used for testing an electronic device under test, e.g. wireless communication equipment that is configured to communicate via WLAN, LTE, and/or 5G New Radio.

In the example embodiment shown in FIG. 1, the signal generator device 10 is a standalone signal generator, i.e. a dedicated electronic instrument. Without restriction of generality, this case is described hereinafter.

The signal generator circuit 11 comprises a digital signal generator circuit 14 that is configured to generate a digital baseband signal. The signal generator circuit 14 may be established as an arbitrary signal generator circuit, i.e. the signal generator circuit 14 is capable of generating an arbitrary digital baseband signal.

Downstream of the digital signal generator circuit 14, a digital compensation circuit 16 is provided. The digital compensation circuit 16 is configured to filter the digital baseband signal generated by the digital signal generator circuit 14 in a predetermined manner, thereby obtaining a filtered baseband signal. This will be explained in more detail below.

In the example embodiment shown in FIG. 1, the signal generator circuit 14 and the digital compensation circuit 16 are integrated in a common field-programmable gate array (FPGA) 18. However, it is to be understood that the signal generator circuit 14 and the digital compensation circuit 16 may also be provided separately from each other.

The signal generator circuit 11 further comprises at least one digital-to-analog converter (DAC) 20 that is provided downstream of the digital compensation circuit 16. The at least one DAC 20 is configured to convert the filtered baseband signal into an analog baseband signal.

Downstream of the at least one DAC 20, an IQ modulation circuit 22 is provided. The IQ modulation circuit 22 is configured to modulate the analog baseband signal based on a continuous wave signal provided by a local oscillator source, thereby obtaining a modulated RF signal.

The signal generator circuit 11 further comprises an RF circuit 24 that is provided downstream of the IQ modulation circuit 22. In general, the RF circuit 24 is configured to process the modulated RF signal, thereby generating an RF output signal that is forwarded to an RF output 26 of the signal generator circuit 11.

In some embodiments, the RF circuit 24 comprises an RF offset unit, a mixer, a power amplifier, an RF detection circuit, an attenuation circuit. It is to be understood that the RF circuit 24 may comprise further and/or other suitable electronic components.

The RF offset unit may include circuitry configured to generate a local oscillator signal having a predefined frequency. The mixer may be configured to mix the modulated RF signal generated by the IQ modulation circuit 22 with the local oscillator signal, such that an RF frequency offset is added to the modulated RF signal, as will be described in more detail below. The power amplifier may be configured to add gain to the modulated RF signal, while the attenuation circuit may be configured to attenuate the modulated RF signal, such that the RF output signal has a desired power level.

The RF detection circuit may be configured to capture the RF output signal downstream of the power amplifier, and to forward the captured RF output signal to a control circuit 28 of the signal generator circuit 11. The RF detection circuit may be configured to pre-process the RF output signal for further processing and analysis by the control circuit 28.

As is illustrated in FIG. 1, the IQ modulation circuit 22 and the RF circuit 24 may at least partially be integrated on a common chip 29. However, it is to be understood that the individual components may also be provided separately from each other.

For different measurements, different aspects of the RF output signal are important. For example, some measurements may require a particularly small error vector magnitude (EVM), while other measurements may require a particularly small adjacent channel leakage ratio (ACLR). In the following, the EVM and the ACLR are each generally called a "performance parameter".

Figure 2:
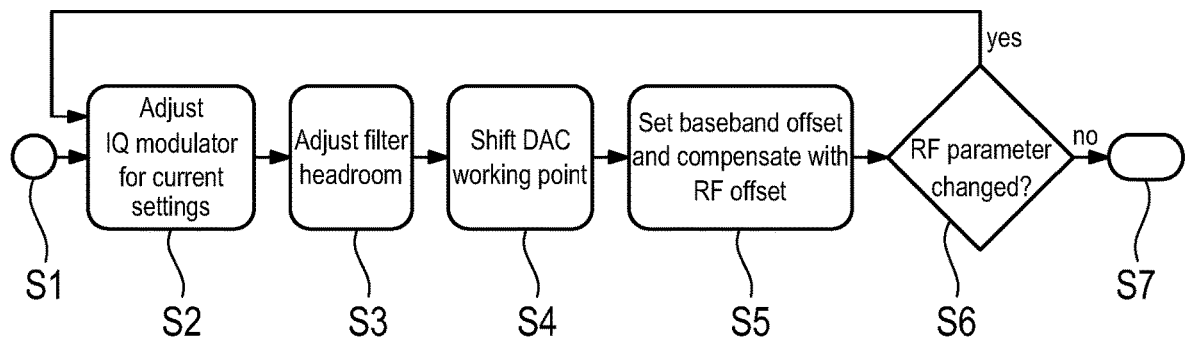
FIG. 2 shows an example of a flow chart of an optimization method according to an embodiment of the present disclosure.

The signal generator device 10 or the control circuit 28 is configured to automatically optimize the performance parameter of the signal generator circuit 11, as is described in the following with reference to the embodiment shown in FIG. 2.

Figure 3:
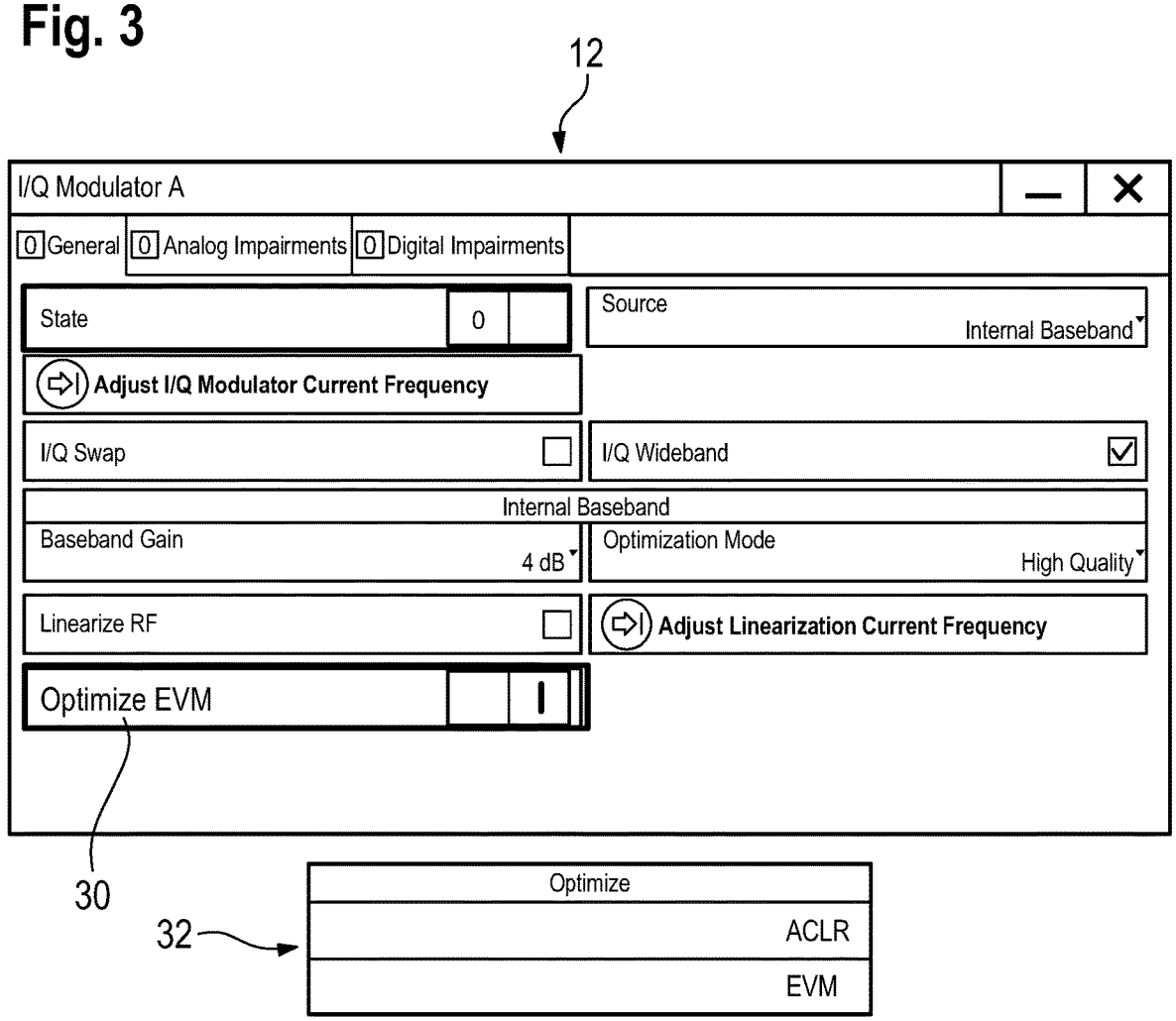
FIG. 3 shows an example of a user interface of the signal generator device of FIG. 1.

The optimization method is started (step S1). As is illustrated in FIG. 3, a user may start the optimization method via the user interface 12. For example, the user interface 12 comprises a button 30 that is used to start the optimization method. In the particular example shown in FIG. 3, the automatic optimization of the performance parameter can be toggled on or off by pressing the button 30.

The user interface 12 may further comprise a drop-down menu 32, wherein the user may select the performance parameter to be optimized via the drop-down menu 32. In other words, the user may select whether the EVM or the ACLR is to be optimized by selecting the corresponding option from the drop-down menu 32.

Alternatively or additionally, the optimization method may be started automatically based on a predefined criterion, e.g. upon start of the signal generator device 10 or if a new measurement mode of the signal generator device 10 or of the signal generator circuit 11 is selected via the user interface 12.

Operational parameters of the IQ modulation circuit 22 are adapted based on the current settings (i.e. the current operational parameters) of the signal generator circuit 11 (step S2). This step is explained in more detail hereinafter with reference to FIGS. 4A, 4B, and 5.

Figure 4A:
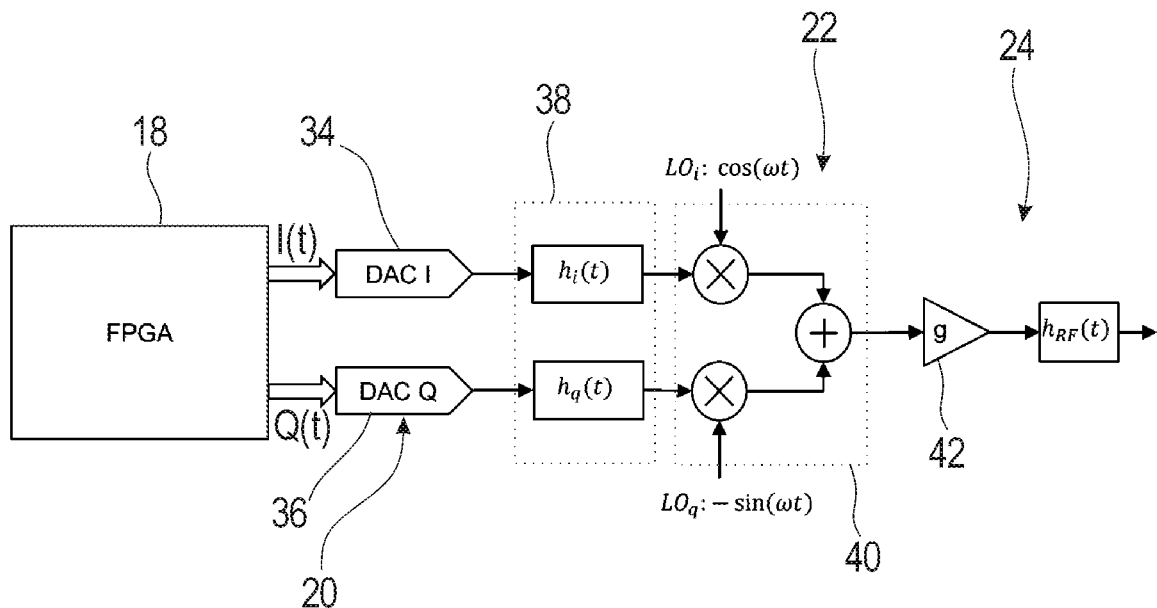
FIG. 4A shows a portion of the signal generator device of FIG. 1 in more detail.

FIG. 4A shows a portion of the signal generator circuit 11 comprising the at least one DAC 20, the IQ modulation circuit 22, and a portion of the RF circuit 24 in more detail. In the example embodiment shown in FIG. 4, the at least one DAC 20 comprises a first DAC 34 that is associated with an I-path of the IQ modulation circuit 22 and a second DAC 36 that is associated with a Q-path of the IQ modulation circuit 22. The filtered baseband signal received from the FPGA 18 comprises an in-phase signal I(t) that is processed by the first DAC 34 and a quadrature signal Q(t) that is processed by the second DAC 36.

The IQ modulation circuit 22 comprises an alias filter 38 that is configured to remove aliasing effects from the output signals of the first DAC 34 and of the second DAC 36, as is indicated by the step responses h_i (t) and h_q (t). The IQ modulation circuit 22 may further comprises a delay circuit that is configured to delay the signal processed in the I-path of the IQ modulation circuit 22 by $\tau\_i$ and/or the signal processed in the Q-path of the IQ modulation circuit 22 by $\tau\_q$. The IQ modulation circuit 22 further comprises a mixer circuit 40 that is configured to mix the baseband signals I(t) and Q(t) with a local oscillator signal, respectively, and to sum the resulting mixed signals, thereby obtaining the modulated RF signal, as is well-known in the state of the art.

The RF circuit 24 has a certain frequency response, which is represented by the step response h_RF (t) in time domain. Further, the RF circuit 24 has a power amplifier 42 that is provided downstream of the mixer circuit 40.

In some embodiments, there may be imbalances between the I-path and the Q-path that may be caused by the step responses h_i (t) and h_q (t) of the alias filter 38. Further, there may be runtime differences between the I-path and the Q-path. Further, the phase difference between the local oscillator signal supplied to the I-path of the mixer circuit 40 and to the Q-path of the mixer circuit 40 may not be exactly 90°.

Figure 4B:
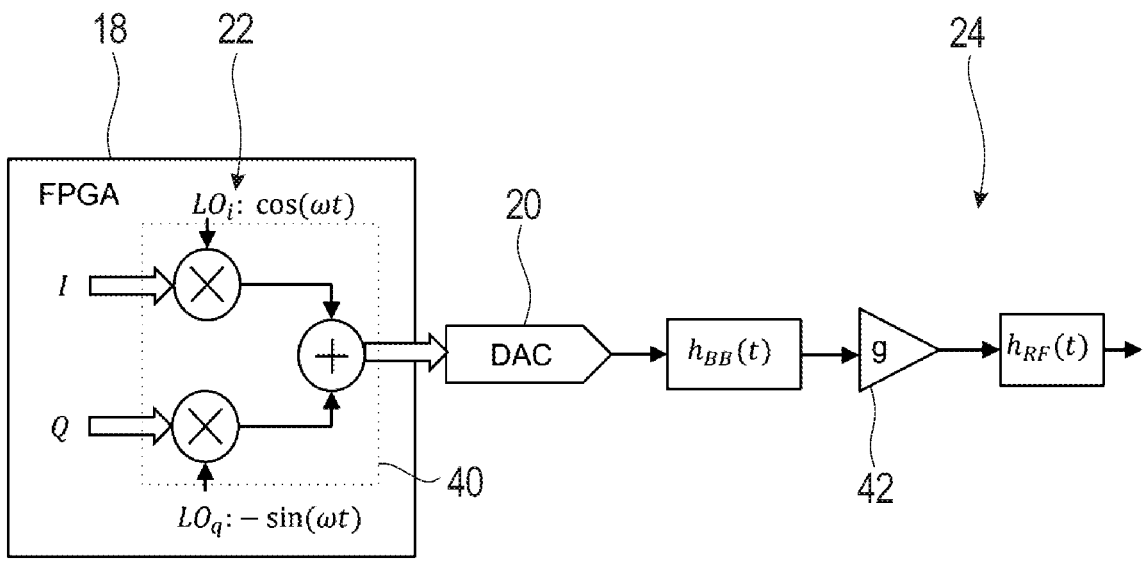
FIG. 4B shows another embodiment of the portion of the signal generator device of FIG. 1 in more detail.

FIG. 4B shows an alternative embodiment of the portion depicted in FIG. 4A, wherein only the differences compared to the embodiment described above are explained in the following. In the embodiment of FIG. 4B, the IQ modulation circuit 22 is integrated into the FPGA 18. In some embodiments, the IQ modulation circuit 22 is interconnected between the digital compensation circuit 16 and the DAC 20.

Thus, the IQ modulation circuit 22 is configured to operate in the digital domain. In other words, the signal generator circuit 11 comprises a direct modulation circuit, comprising the digital signal generator circuit 11 and the IQ modulation circuit 22. The IQ modulation circuit 22 is configured to modulate the filtered baseband signal, thereby obtaining a digital modulated RF signal.

The DAC 20 is configured to convert the digital modulated RF signal into a modulated RF signal, wherein the modulated RF signal is an analog signal. The RF circuit 24 is configured to process the modulated RF signal, thereby obtaining the RF output signal.

Figure 5:
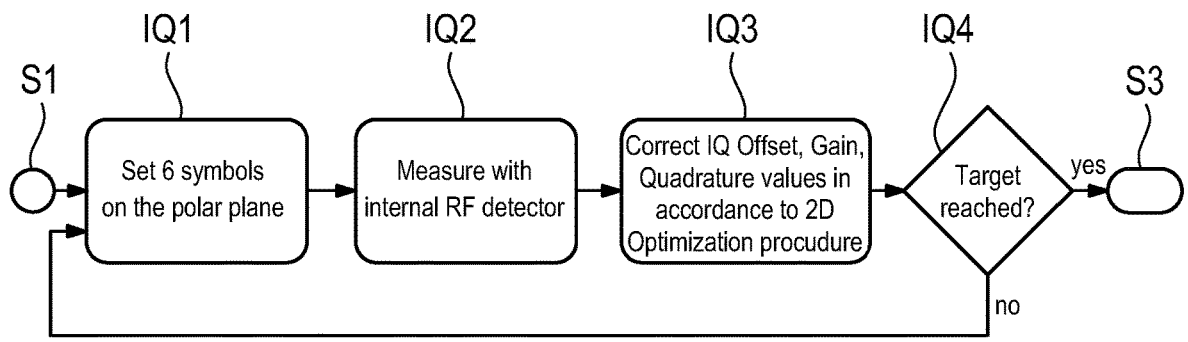
FIG. 5 shows an example of a flow chart of an optimization procedure for operational parameters of an IQ modulation circuit.

The mismatches described above may be corrected by adapting the operational parameters of the IQ modulation circuit 22, namely an IQ offset, a gain, and/or a quadrature value as illustrated in the example shown in FIG. 5.

Without restriction of generality, the explanations provided hereinafter relate to the embodiment shown in FIG. 4A. However, it is to be understood that the explanations given hereinafter also apply to the embodiment shown in FIG. 4B, possibly with minor adjustments.

A predefined number of symbols corresponding to a predefined number of constellation points is set in the polar plane (step IQ1). In the example shown in FIG. 5, the predetermined number of constellation points is equal to six. However, it is to be understood that any other suitable number of constellation points may be used.

The resulting RF output signal is measured via the control circuit 28 (step IQ2).

The IQ offset of the IQ modulation circuit 22, the gain of the IQ modulation circuit 22, and/or the quadrature value of the IQ modulation circuit 22 are adapted by a numerical optimization technique (step IQ3).

In some embodiments, any suitable numerical optimization technique known in the state of the art may be used. For example, an array of independent non-linear equations may be set up based on the RF output signal.

The IQ offset, the gain, and/or the quadrature value may be adapted by solving the array of independent non-linear equations. For example, the array of independent non-linear equations may be solved using the Newton-Raphson method.

In general, the operational parameters of the IQ modulation circuit 22 are adapted such that the actual constellation points of the RF output deviate less from their associated optimal constellation points, i.e. the EVM is reduced.

In step IQ4, it is checked whether a target EVM has been met. If the target EVM has not been met, steps IQ1 to IQ3 may be repeated, i.e. the operational parameters of the IQ modulation circuit 22 may be iteratively adapted. If the target EVM has been met, the optimization method may continue with step S3 (see FIG. 2).

In step S3, a filter headroom of the digital compensation circuit 16 is adapted. Alternatively or additionally, a frequency response of the digital compensation circuit 16 is adapted by adapting filter parameters of the digital compensation circuit 16.

Figure 6:
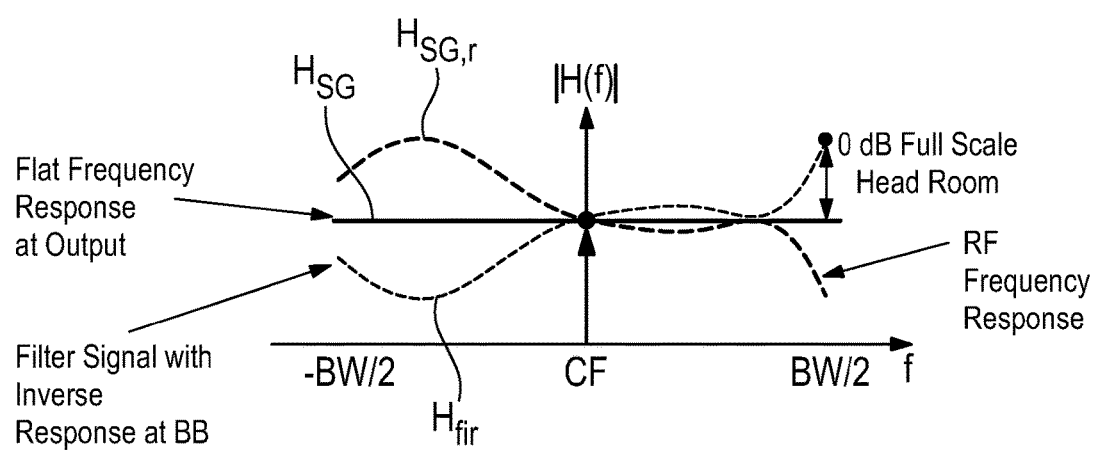
FIG. 6 shows a diagram of several frequency responses of components of the signal generator device of FIG. 1.

As is illustrated in the example of FIG. 6, the filter parameters of the digital compensation circuit 16 are adapted such that the frequency response H_fir of the digital compensation circuit 16 pre-compensates the frequency response H_(SG,r) of the remaining signal generator circuit 11, for example the frequency responses of the IQ modulation circuit 22 (represented by h_i (t) and h_q (t) in FIG. 4A) and of the RF circuit 24 (represented by h_RF (t) in FIG. 4A). As a result, the overall frequency response H_SG of the signal generator circuit 11 is flat over the relevant frequency spectrum, namely plus/minus half of the bandwidth of the baseband signal around a central frequency CF.

Figure 7:
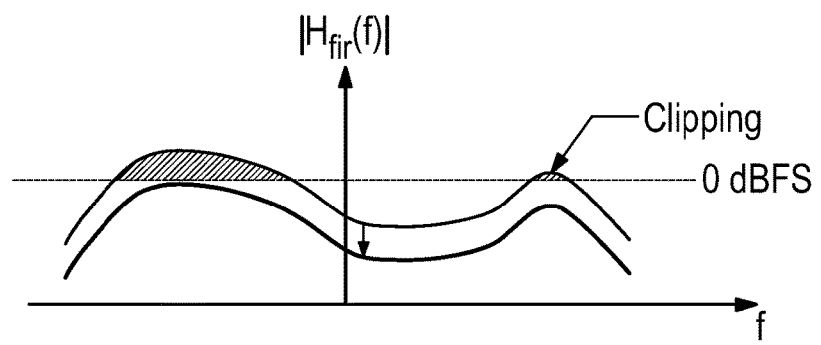
FIG. 7 shows a diagram illustrating clipping in the digital domain.

The headroom of the digital compensation circuit 16 has to be adjusted such that no clipping occurs within the digital compensation circuit 16, for example by changing the power level of the digital baseband signal. As is illustrated in FIG. 7, the power level of the of the digital baseband signal may be lowered in order to avoid clipping.

Figure 8:
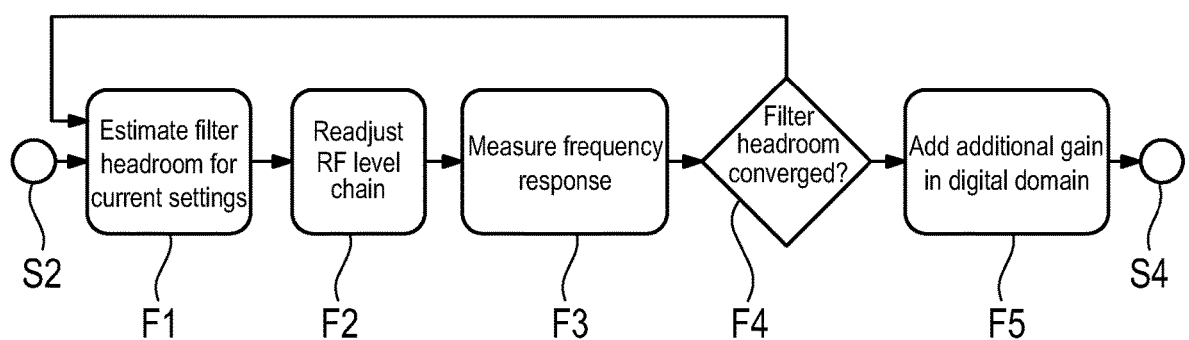
FIG. 8 shows an example of a flow chart of an optimization procedure for a filter headroom and gain in the digital domain.

The adjustment of the filter headroom is explained in more detail hereinafter with reference to FIG. 8. The headroom of the digital compensation circuit 16 is estimated based on the current operational parameters and for a current frequency response of the signal generator circuit 11 (step F1).

Operational parameters of the RF circuit 24 are adapted (step F2). In some embodiments, a gain of the power amplifier 42 is adapted such that the RF output signal has a desired power level.

Based on the resulting RF output signal, the frequency response of the signal generator circuit 11 is measured (step F3).

In step F4, the filter headroom of the digital compensation circuit 16 is determined based on the determined frequency response.

If the filter headroom differs from the previously estimated filter headroom, steps F1 to F3 may be repeated, wherein the filter headroom and/or the frequency response of the digital compensation circuit 16 may be adapted. In other words, the filter headroom and/or the operational parameters of the RF circuit 24 may be adjusted iteratively.

In some embodiments, this may be necessary, as the filter headroom depends on the frequency response of the signal generator circuit 11, but the frequency response changes when the filter headroom changes. Thus, multiple iterations may be necessary.

If the filter headroom does not differ from the previously estimated filter headroom, additional gain may be added in the digital domain, i.e. the power level of the digital baseband signal may be raised (step F5). The gain added in the digital domain may depend on a current filter headroom of the digital compensation circuit 16. For example, the added gain may be up to 6 dB. Alternatively or additionally, a power loss between the at least one ADC 20 and the IQ modulation circuit 22 may be measured or estimated, and the gain added in the digital domain may be determined based on the power loss.

In step S4, the operating point of the at least one DAC 20 is adapted, for example by lowering or raising the power level of the digital baseband signal.

If the performance parameter to be optimized is an EVM, the operating point of the at least one DAC 20 may be raised. By raising the operating point of the at least one DAC 20, the signal-to-noise ratio (SNR) of the RF output signal is increased, which in general leads to a smaller EVM.

This may come at the cost of the at least one DAC 20 being operated in a non-linear region, i.e. at signal levels where there is a non-linear relation between an output signal of the at least one DAC 20 and an input signal of the at least one DAC 20. However, increasing the SNR is more important for lowering the EVM than such non-linearities of the at least one DAC 20.

In some embodiments, increasing the SNR leads to lower values of the EVM, while operating the at least one DAC 20 in an early non-linear region does not impact modulated signals, e.g. OFDM signals, significantly.

If the performance parameter to be optimized is an ACLR, the operating point of the at least one DAC 20 may be lowered. By lowering the operating point, the at least one DAC 20 is operated in a linear region, i.e. there is a linear relation between an output signal of the at least one DAC 20 and an input signal of the at least one DAC 20. In general, the ACLR is reduced by operating the at least one DAC 20 in the linear region.

Lowering the operating point of the at least one DAC 20 may come at the cost of a reduced SNR. However, operating the at least one DAC 20 in a linear region is more important for lowering the ACLR than a reduced SNR.

A baseband frequency offset is set, and is compensated by a corresponding RF frequency offset (step S5). Therein, the baseband frequency offset is added by the signal generator circuit 14, i.e. the signal generator circuit 14 generates the baseband signal with a shifted central frequency. For example, the signal generator circuit 14 may shift the central frequency of the baseband signal by half of the bandwidth of the baseband signal. As another example, the signal generator circuit 14 may shift the central frequency of the baseband signal by half of the bandwidth of the baseband signal plus a predefined safety margin.

The baseband frequency shift may be displayed via the user interface 12. In some embodiments, the baseband frequency shift is adaptable via the user interface 12.

In the RF circuit 24, the RF frequency offset may be added to the modulated RF signal via an RF offset unit and a mixer of the RF circuit 24, wherein the RF frequency offset corresponds to the inverse shift, i.e. the frequency of the modulated RF signal is shifted back to the originally intended central frequency.

This way, LO leakage effects can be reduced significantly. In some embodiments, in combination with the adaptation of the operational parameters of the IQ modulation circuit 22, LO leakage effects can be completely removed, and image signals are completely removed from the resulting RF output signal.

After the adjustments of the operational parameters of the signal generator circuit 11 performed in steps S1 to S5 described above, the resulting RF output signal is analyzed via the control circuit 28, thereby obtaining an adapted performance parameter (step S6).

If the adapted performance parameter has changed (by at least a predetermined amount) compared to a previously determined performance parameter, steps S2 to S5 may be repeated. In other words, the operational parameters of the signal generator circuit 11 are adapted iteratively, until the performance parameter converges, wherein the limit of the iteratively adapted performance parameters corresponds to an optimized performance parameter.

If the adapted performance parameter has not changed (by at least a predetermined amount) compared to a previously determined performance parameter, the optimization procedure is ended (step S7).

As already mentioned above, the automatic optimization procedure may be toggled on or off via the user interface 12.

For the optimization of the performance parameter, all steps described above may be performed. However, there may be situations, where only a certain subset of the steps described above may be performed.

For example, the IQ offset, the gain and the quadrature value of the IQ modulation circuit 22 are frequency-dependent. Further, signal errors are dependent on a crest factor of the digital baseband signal. Further, the power level of the RF circuit also has an influence on the IQ modulation circuit 22.

Accordingly, the operational parameters of the IQ modulation circuit 22 may be adapted as described above if a central frequency of the RF output signal changes, if a modulation type of the RF output signal changes, if a power level of the RF output signal changes, and/or if the digital baseband signal changes in frequency, bandwidth and/or shape.

For an RF output signal with a lower signal bandwidth, there is enough energy within the in-band which already results in high SNR. Thus, no further optimization may be required. In addition, the filter headroom is quite small, resulting in no additional back-off from full scale.

For increasing signal bandwidths, the in-band spreads out over higher bandwidths which leads to decreased SNR. In addition, the filter headroom increases, and thus the digital back-off from full scale increases as well. The gain optimization in the digital domain described above may thus be activated.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be used synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

In some embodiments, one or more computer-readable media contains the computer readable instructions embodied thereon that, when executed by the one or more computer circuits, sometimes referred to as computing devices, cause the one or more computer circuits to perform one or more steps of any of the claimed methods set forth below.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An optimization method of automatically optimizing a performance parameter of a signal generator circuit, the signal generator circuit comprising a digital signal generator circuit, a digital compensation circuit, at least one digital-to-analog converter (DAC), an in-phase and quadrature (IQ) modulation circuit, a radio-frequency (RF) circuit, and a control circuit, the optimization method comprising:
generating, by the digital signal generator circuit, a digital baseband signal;
filtering, by the digital compensation circuit, the digital baseband signal, thereby obtaining a filtered baseband signal;
converting, by the at least one DAC, the filtered baseband signal into an analog baseband signal;
modulating, by the IQ modulation circuit, the analog baseband signal, thereby obtaining a modulated RF signal,
processing, by the RF circuit, the modulated RF signal, thereby obtaining an RF output signal,
determining, by the control circuit, a performance parameter of the signal generator circuit based on the RF output signal, and
automatically adapting, by the control circuit, at least one operational parameter of the signal generator circuit in order to optimize the performance parameter;
wherein the at least one operational parameter comprises a power level of the digital baseband signal, a baseband frequency offset of the digital baseband signal, a filter headroom of the digital compensation circuit, a frequency response of the digital compensation circuit, an operating point of the at least one DAC, an IQ offset of the IQ modulation circuit, a gain of the IQ modulation circuit, a quadrature value of the IQ modulation circuit, and/or an RF frequency offset of the RF circuit;
wherein the performance parameter is an error vector magnitude (EVM) or an adjacent channel leakage ratio (ACLR), and
wherein the operating point of the at least one DAC is raised if the performance parameter is an EVM and/or wherein the operating point of the at least one DAC is lowered if the performance parameter is an ACLR.

2. The optimization method of claim 1, wherein the at least one operational parameter is adapted iteratively.

3. The optimization method of claim 1, wherein a frequency response of the IQ modulation circuit and/or a frequency response of the RF circuit is determined in order to adapt the at least one operational parameter.

4. The optimization method of claim 3, wherein the frequency response of the digital compensation circuit is adapted to pre-compensate the frequency response of the IQ modulation circuit and/or the frequency response of the RF circuit.

5. The optimization method of claim 3, wherein the frequency response of the digital compensation circuit is adapted such that an overall frequency response of the signal generator circuit is flat.

6. The optimization method of claim 1, wherein the IQ offset of the IQ modulation circuit, the gain of the IQ modulation circuit, and/or the quadrature value of the IQ modulation circuit is adapted by a numerical optimization technique.

7. The optimization method of claim 1, wherein a predetermined baseband signal corresponding to a predetermined number of constellation points is generated in order to adapt the IQ offset of the IQ modulation circuit, the gain of the IQ modulation circuit, and/or the quadrature value of the IQ modulation circuit.

8. The optimization method of claim 1, wherein the RF frequency offset compensates for the baseband frequency offset.

9. The optimization method of claim 1, wherein the signal generator circuit comprises a user interface, wherein the optimization method is started by the user interface.

10. A signal generator circuit, comprising a digital signal generator circuit, a digital compensation circuit, at least one digital-to-analog converter (DAC), an in-phase and quadrature (IQ) modulation circuit, a radio-frequency (RF) circuit, and a control circuit,
wherein the digital signal generator circuit is configured to generate a digital baseband signal,
wherein the digital compensation circuit is configured to filter the digital baseband signal, thereby obtaining a filtered baseband signal,
wherein the at least one DAC is configured to convert the filtered baseband signal into an analog baseband signal,
wherein the IQ modulation circuit is configured to modulate the analog baseband signal, thereby obtaining a modulated RF signal,
wherein the RF circuit is configured to process the modulated RF signal, thereby obtaining an RF output signal,
wherein the control circuit is configured to determine a performance parameter of the signal generator circuit based on the RF output signal,
wherein the control circuit is configured to automatically adapt at least one operational parameter of the signal generator circuit in order to optimize the performance parameter,
wherein the at least one operational parameter comprises a power level of the digital baseband signal, a baseband frequency offset of the digital baseband signal, a filter headroom of the digital compensation circuit, a frequency response of the digital compensation circuit, an operating point of the at least one DAC, an IQ offset of the IQ modulation circuit, a gain of the IQ modulation circuit, a quadrature value of the IQ modulation circuit, and/or an RF frequency offset of the RF circuit,
wherein the performance parameter is an error vector magnitude (EVM) or an adjacent channel leakage ratio (ACLR), and
wherein the control circuit is configured to raise the operating point of the at least one DAC if the performance parameter is an EVM and/or wherein the control circuit is configured to lower the operating point of the at least one DAC if the performance parameter is an ACLR.

11. The signal generator circuit of claim 10, wherein the signal generator circuit comprises a user interface, wherein the signal generator circuit is controllable via the user interface to perform an optimization of the performance parameter.

12. The signal generator circuit of claim 10, wherein the RF circuit comprises at least one RF filter, at least one power amplifier, at least one mixer, and/or at least one switch.

13. The signal generator circuit of claim 10, wherein the control circuit is configured to determine a frequency response of the IQ modulation circuit and/or a frequency response of the RF circuit.

14. The signal generator circuit of claim 13, wherein the control circuit is configured to adapt the frequency response of the digital compensation circuit such that the frequency response of the IQ modulation circuit and/or the frequency response of the RF circuit are/is pre-compensated.

15. The signal generator circuit of claim 14, wherein the control circuit is configured to adapt the frequency response of the digital compensation circuit such that an overall frequency response of the signal generator circuit is flat.

16. The signal generator circuit of claim 10, wherein the RF circuit is configured to add the RF frequency offset to the modulated RF signal, and wherein the control circuit is configured to generate the RF frequency offset such that the RF frequency offset compensates for the baseband frequency offset.

17. A signal generator circuit, comprising a digital signal generator circuit, a digital compensation circuit, at least one digital-to-analog converter (DAC), an in-phase and quadrature (IQ) modulation circuit, a radio-frequency (RF) circuit, and a control circuit,
wherein the digital signal generator circuit is configured to generate a digital baseband signal,
wherein the digital compensation circuit is configured to filter the digital baseband signal, thereby obtaining a filtered baseband signal,
wherein the IQ modulation circuit is configured to modulate the filtered baseband signal, thereby obtaining a digital modulated RF signal,
wherein the at least one DAC is configured to convert the digital modulated RF signal into a modulated RF signal, wherein the modulated RF signal is an analog signal,
wherein the RF circuit is configured to process the modulated RF signal, thereby obtaining an RF output signal,
wherein the control circuit is configured to determine a performance parameter of the signal generator circuit based on the RF output signal,
wherein the control circuit is configured to automatically adapt at least one operational parameter of the signal generator circuit in order to optimize the performance parameter,
wherein the at least one operational parameter comprises a power level of the digital baseband signal, a baseband frequency offset of the digital baseband signal, a filter headroom of the digital compensation circuit, a frequency response of the digital compensation circuit, an operating point of the at least one DAC, and/or an RF frequency offset of the RF circuit,
wherein the performance parameter is an error vector magnitude (EVM) or an adjacent channel leakage ratio (ACLR), and
wherein the control circuit is configured to raise the operating point of the at least one DAC if the performance parameter is an EVM and/or wherein the control circuit is configured to lower the operating point of the at least one DAC if the performance parameter is an ACLR.

* * * * *